No. 871,226. PATENTED NOV. 19, 1907.
L. W. JONES.
WATER SOFTENER APPARATUS.
APPLICATION FILED JAN. 23, 1907.

2 SHEETS—SHEET 1.

WITNESSES.
INVENTOR.

No. 871,226.

PATENTED NOV. 19, 1907.

L. W. JONES.
WATER SOFTENER APPARATUS.
APPLICATION FILED JAN. 23, 1907.

2 SHEETS—SHEET 2.

WITNESSES.

INVENTOR.

UNITED STATES PATENT OFFICE.

LLEWELLYN W. JONES, OF SEWICKLEY, PENNSYLVANIA, ASSIGNOR TO PITTSBURGH FILTER MANUFACTURING COMPANY, OF PITTSBURG, PENNSYLVANIA, A CORPORATION OF PENNSYLVANIA.

WATER-SOFTENER APPARATUS.

No. 871,226.    Specification of Letters Patent.    Patented Nov. 19, 1907.

Application filed January 23, 1907. Serial No. 353,681.

To all whom it may concern:

Be it known that I, LLEWELLYN W. JONES, a resident of Sewickley, in the county of Allegheny and State of Pennsylvania, have invented a new and useful Improvement in Water-Softener Apparatus; and I do hereby declare the following to be a full, clear, and exact description thereof.

My invention relates to water softening apparatus, its object being to improve and simplify such apparatus by reducing the number of parts whereby the cost of the same is greatly reduced.

To these ends my invention comprises the novel features hereafter set forth and claimed.

Figure 1:
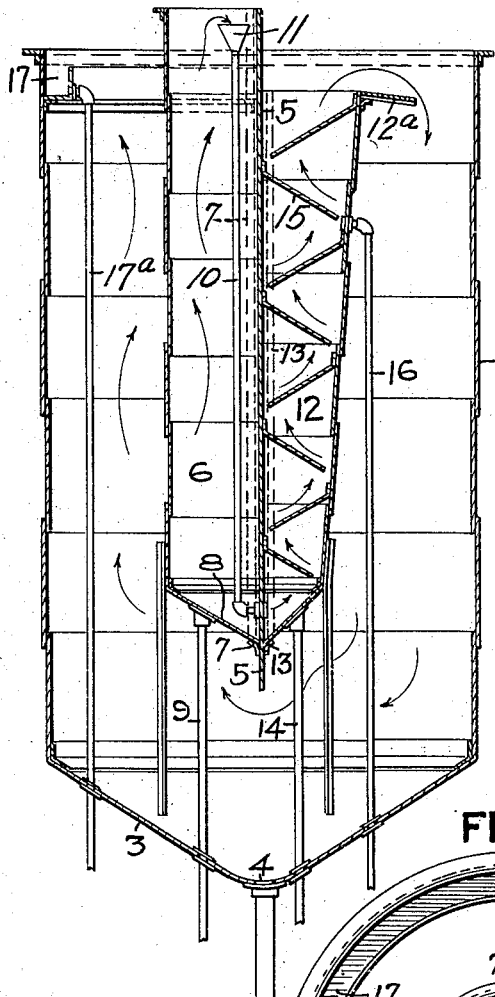
Figure 3:
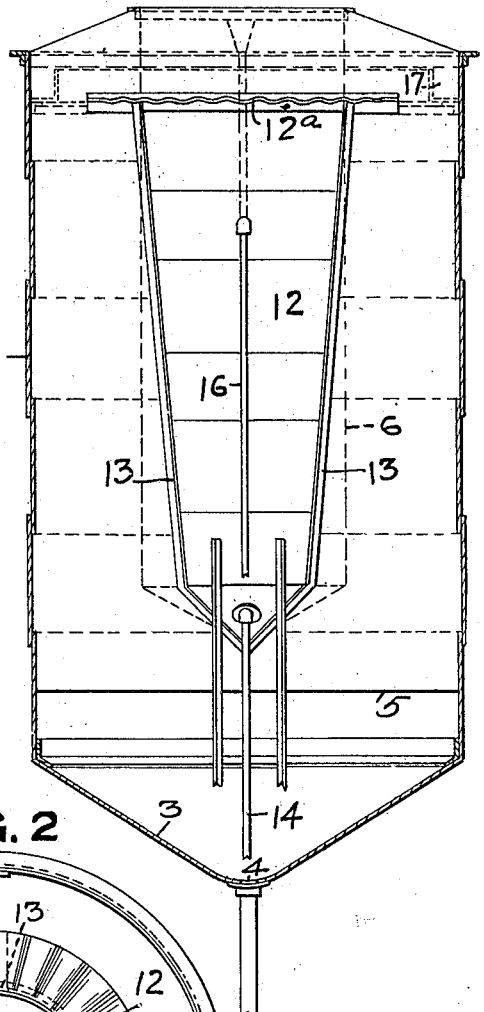
Figure 2:
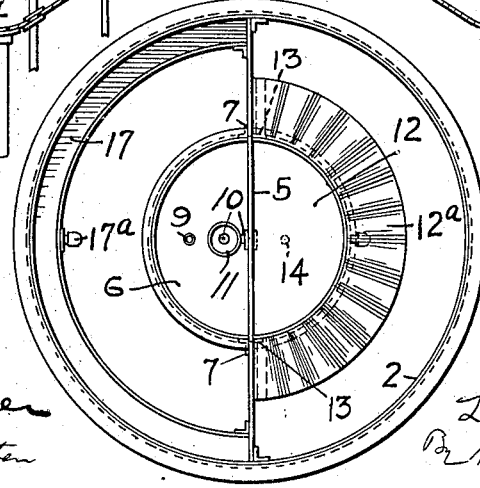
Figure 4:
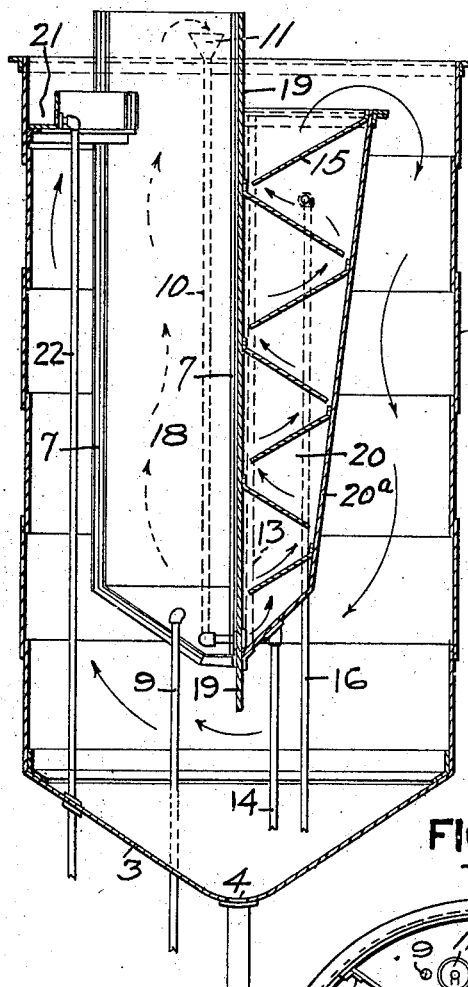
Figure 6:
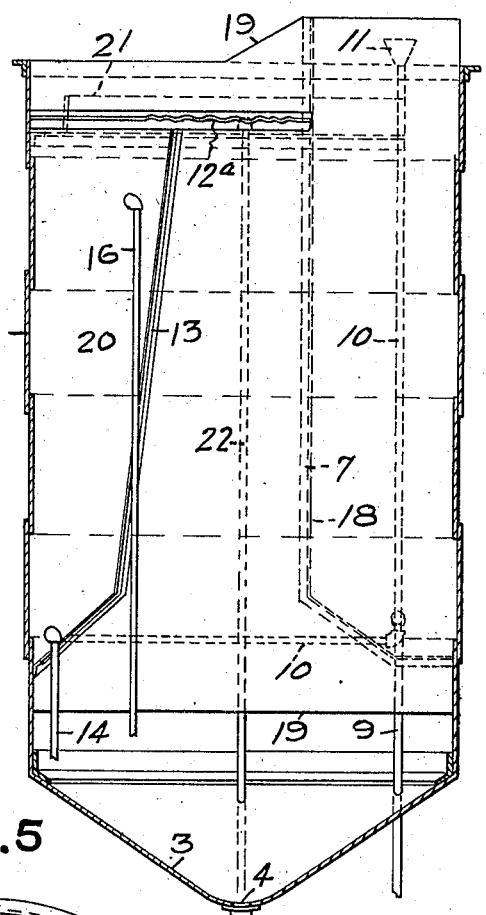
Figure 5:
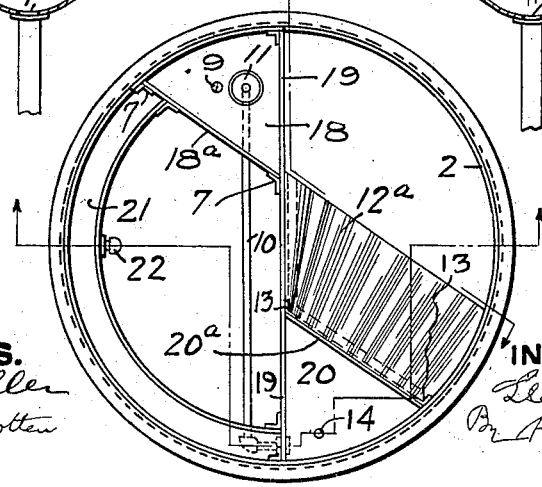

In the drawings Figure 1 is a sectional elevation of a water softening tank showing my invention as applied thereto; Fig. 2 is a plan view thereof; Fig. 3 is a face view of the baffle plate showing the mixing chamber secured thereto; and Figs. 4, 5 & 6 show a modified form of my invention.

As my invention relates to the construction and arrangement of the solution and reaction chambers I have not deemed it necessary to illustrate in detail all the accompanying apparatus, such as the lime and soda tanks, the pumps for forcing the lime and soda into the solution and reaction chambers, together with the motor for delivering the water to be treated to the reaction chamber and so forth. Accordingly in the drawings the numeral 2 designates a suitable tank having the sloping bottom 3 with the central opening 4 for carrying off the deposit. Within the tank 2 is the baffle plate 5 extending down a suitable distance within said tank, and secured at opposite sides to said tank. The solution chamber 6 is preferably semicylindrical or trough-shaped in form and is secured to one side of the baffle 5, said chamber having the angle pieces 7 by means of which it is riveted to said baffle. The lower end of the solution chamber has the sloping bottom 8 to which the pipe 9 is connected by means of which the lime water is delivered to said solution chamber. The lime water may be pumped from a suitable tank and forced through the pipe 9 into the lower end of said solution chamber. By attaching the solution chamber to the baffle in this manner the baffle forms one wall of the solution chamber and as a consequence there is great saving of material over a construction where an individual circular chamber is employed.

Within the solution chamber 6 is the overflow pipe 10 having at its upper end the funnel 11. The lower end of the pipe 10 passes through the baffle 5 and communicates with the bottom of the reaction chamber 12. This reaction or mixing chamber is preferably tapering in form toward the bottom or substantially semi-conical, as clearly illustrated. This reaction chamber 12 is also secured to the opposite side of the baffle 5 by the angles 13. Connected to the lower end of the reaction chamber 12 is the pipe 14 by means of which the water to be treated is introduced to said reaction chamber. This pipe 14 may be connected up with the exhaust of a suitable water motor or pump whereby the water is forced up through the pipe into the chamber 12. The chamber 12 may be provided with baffles 15 to retard the flow of the lime water and water to be treated as they pass up through said reaction chamber in order that they may be thoroughly mixed before they pass from the upper end of the reaction chamber and overflow into the tank 2. A pipe 16 may be connected up with a suitable soda tank for supplying the soda solution or other reagent to the mixing or reaction chamber. Extending out from the upper end of the chamber 12 is the corrugated apron 12ª which delivers the water to about the center of the downtake compartment and so distributes it properly, and prevents a down-current close to the chamber 12.

At the upper end of the tank 2 is the semicircular trough 17 which receives the treated water, and leading from said trough is the pipe 17ª for carrying off said water to a suitable reservoir.

When my improved apparatus is in operation the solution of lime from the solution chamber 6 passes into the lower end of the reaction chamber 12 and there meets with the raw water entering by the pipe 14. The raw water and lime solution pass up through said reaction chamber and overflow from the top thereof and descend in the space between the baffle and that side of the tank 2, said water as it descends through said tank being permitted to deposit the carbonate of lime, which collects in the bottom of the tank 2 to be drawn off as desired by the pipe 4. The water in its descent passes beneath the baffle 5 whence it rises on that side of the baffle and passes up and overflows into the trough 17, whence it is carried off by the pipe 17$^a$.

With the above construction I provide for the proper circulation of the water in such a way as to provide for the deposit of the carbonate of lime, while at the same time I employ but a single baffle. The solution and reaction chambers are secured to this baffle at opposite sides thereof, said baffle forming one wall of each of said chambers and thereby greatly simplifying the construction as well as cheapening the cost.

In Figs. 4, 5 and 6 I have illustrated a modified form of my invention in which the solution chamber 18 is formed by securing the plate 18$^a$ to the tank and to the baffle 19. The reaction chamber 20 is likewise formed by the plate 20$^a$ secured to the opposite side of the baffle 19 and to the tank. The plate 20$^a$ may be made tapering in form so as to taper the shape of the reaction chamber. In this construction the water entering the bottom of the reaction chamber 20 by the pipe 14 is met by the lime in solution from the chamber 18 and both are carried up through the reaction chamber and overflow the plate 12$^a$ into the tank. The water descends the tank on that side of the baffle 19 and the sediment is deposited as it descends when the water passing under the lower end of the baffle 19 rises in the tank and overflows into the trough 21 to be carried off by the pipe 22.

What I claim is:

1. In water softening apparatus, the combination of a tank, a single baffle plate dividing said tank into two compartments, and a reaction chamber in said tank on one side of said baffle, said reaction chamber communicating at its upper end with said tank.

2. In water softening apparatus, the combination of a tank, a single baffle plate dividing said tank into two compartments, and a reaction chamber secured to one side of said baffle plate and communicating at its upper end with the down-take compartments of said tank.

3. In water softening apparatus, the combination of a suitable tank, a single baffle plate dividing said tank into down-take and up-take compartments, a semi-conical reaction chamber secured to one side of said baffle plate, said reaction chamber communicating at its upper end with said down-take compartment of said tank.

4. In water softening apparatus, the combination of a suitable tank, a single baffle plate dividing said tank into a down-take and an up-take compartment, a trough shaped reaction chamber secured to one side of said baffle plate communicating at its upper end with the down-take compartment of said tank.

5. In water softening apparatus, the combination of a suitable tank, a single baffle plate dividing said tank into down-take and up-take compartments, a reaction chamber on one side of said baffle plates communicating at its upper end with said down-take compartment and a solution chamber on the other side of said baffle plate in said uptake compartment, said solution chamber communicating with said reaction chamber.

6. In water softening apparatus, the combination of a suitable tank, a single baffle plate dividing said tank into down-take and up-take compartments, substantially semi-cylindrical or trough-shaped reaction and solution chambers secured to opposite sides of said baffle plate, said reaction chamber communicating at its upper end with said down-take compartment.

7. In water softening apparatus, the combination of a suitable tank, a single baffle plate dividing said tank into down-take and up-take compartments, a reaction chamber secured to said baffle-plate and communicating at its upper end with said down-take compartment, and an apron projecting from the upper end of said chamber.

8. In water softening apparatus, the combination of a suitable tank, a single baffle plate dividing said tank into down-take and up-take compartments, a reaction chamber secured to said baffle-plate and communicating at its upper end with said down-take compartment, and a corrugated apron projecting from the upper end of said chamber.

In testimony whereof, I the said LLEWELLYN W. JONES have hereunto set my hand.

LLEWELLYN W. JONES.

Witnesses:
ROBERT C. TOTTEN,
ROBT. D. TOTTEN.